United States Patent
Drouet et al.

(10) Patent No.: US 7,647,379 B2
(45) Date of Patent: Jan. 12, 2010

(54) SYSTEM AND METHOD FOR RE-ROUTING MESSAGING TRAFFIC TO EXTERNAL RESOURCES

(75) Inventors: Francois-Xavier Drouet, Nice (FR); Vincent Outters, Gattieres (FR)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 11/009,328

(22) Filed: Dec. 9, 2004

(65) Prior Publication Data
US 2005/0135255 A1   Jun. 23, 2005

(30) Foreign Application Priority Data
Dec. 19, 2003   (EP)  .................. 03368120

(51) Int. Cl.
*G06F 15/16*   (2006.01)
(52) U.S. Cl. ...................... 709/206; 709/223
(58) Field of Classification Search ............... 709/206, 709/224, 226, 239, 241; 370/237, 351
See application file for complete search history.

(56) References Cited

U.S. PATENT DOCUMENTS

| | | | | | |
|---|---|---|---|---|---|
| 5,852,724 | A | * | 12/1998 | Glenn et al. | 709/239 |
| 5,872,930 | A | * | 2/1999 | Masters et al. | 709/223 |
| 6,185,695 | B1 | * | 2/2001 | Murphy et al. | 714/4 |
| 6,892,222 | B2 | * | 5/2005 | McDowell et al. | 709/206 |
| 6,971,044 | B2 | * | 11/2005 | Geng et al. | 714/11 |
| 7,020,082 | B2 | * | 3/2006 | Bhagavath et al. | 370/230 |
| 7,058,683 | B1 | * | 6/2006 | Belissent et al. | 709/206 |
| 7,069,309 | B1 | * | 6/2006 | Dodrill et al. | 709/219 |
| 7,181,523 | B2 | * | 2/2007 | Sim | 709/226 |
| 7,249,179 | B1 | * | 7/2007 | Romero et al. | 709/226 |
| 7,281,031 | B1 | * | 10/2007 | Wang et al. | 709/213 |
| 7,310,816 | B1 | * | 12/2007 | Burns et al. | 726/24 |
| 7,318,107 | B1 | * | 1/2008 | Menon | 709/239 |
| 2001/0032245 | A1 | * | 10/2001 | Fodor | 709/206 |
| 2003/0088693 | A1 | * | 5/2003 | Cheung et al. | 709/238 |
| 2003/0158905 | A1 | * | 8/2003 | Petry et al. | 709/206 |
| 2004/0024861 | A1 | * | 2/2004 | Coughlin | 709/224 |
| 2005/0044150 | A1 | * | 2/2005 | Kaminsky et al. | 709/206 |
| 2005/0102393 | A1 | * | 5/2005 | Murray et al. | 709/224 |
| 2005/0193064 | A1 | * | 9/2005 | Hales | 709/206 |

* cited by examiner

*Primary Examiner*—William C Vaughn, Jr.
*Assistant Examiner*—Thomas Richardson
(74) *Attorney, Agent, or Firm*—Norman Gundel; Hoffman Warnick LLC

(57) ABSTRACT

Method of re-routing mail traffic exchanged with a messaging system in a data transmission system in which at least one user connected to an IP transport network such as the Internet can transmit requests to and receive data from a plurality of servers through a load balancer, wherein at least one of the servers being a mail server in charge of mail exchange with the user through the IP transport network. This method comprises the steps of forwarding a routing context to an external service infrastructure partner (SIP) device when the system is triggered by an event A, reconfiguring the load balancer in order to be able to send a mail protocol to the SIP device when receiving the mail traffic to be re-routed to the SIP device, and forwarding a user context to the SIP device.

5 Claims, 3 Drawing Sheets

SYSTEM AND METHOD FOR RE-ROUTING MESSAGING TRAFFIC TO EXTERNAL RESOURCES

TECHNICAL FIELD

The invention relates to the use of complementary resources when application usage increases through peaks and in particular, relates to a system and a method for re-routing Internet Protocol (IP) messaging traffic to external resources.

BACKGROUND

The primary goal of most Information Technology (IT) systems is to meet required performance and service availability levels for managed applications at the lowest possible cost and risk, while maintaining the highest customer satisfaction. In trying to achieve this goal, the management processes of traditional systems have over-provisioned their data center, particularly when the Internet network has workload levels that vary from relatively predictable to unpredictable (e.g., spiky). Such an over-provisioning includes the dedication of sufficient computing capacity to support each application during its highest potential user demand.

Until now, the reality of over-provisioning has resulted in high costs accompanied with unpredictable service levels, while today's business environment is fast paced and demanding. To be successful and competitive, IT systems must meet business demands by delivering what is needed, where it is needed, and when it is needed. As such, in a dynamic and fluctuating marketplace, new on-demand processes and technologies are required. In today's economy, companies, and in a general way, IT organizations, cannot afford to maintain a server capacity for just-in-case situations, but need optimized and flexible infrastructures.

Different products already exist that constantly monitor service levels, anticipate resource requirements for peak workloads, and then automatically implement the needed services. For example, IBM's Tivoli Intelligent ThinkDynamic Orchestrator can be used to create, customize, and store workflow, personalized with specific policies and procedures, to automate processes in testing and data centers. The execution of these processes can be gradually implemented in a manual, semi-automatic, and finally automatic mode. This allows a company to progress at its own evolutionary pace to become a dynamic and automated on-demand business. However, these products are currently centered on resources they own (resources that have been assigned) and more importantly do not include definitions (workflow) for mail service provisioning.

In a data center, computing resources are finite and the business importance of each application varies. For this reason, such products as IBM's Tivoli Intelligent ThinkDynamic Orchestrator only help optimize resource allocation based on the relative importance of each application. For example, a lower priority application such as mail may be temporarily shut down while waiting for a higher priority application to be run according to its agreed service levels, until the load falls below a required threshold.

SUMMARY OF THE INVENTION

Accordingly, an object of the invention is to provide a system and to achieve a method enabling an external mail infrastructure to be used when the mail servers of a data center are supporting other higher priority applications during on-demand peaks.

Another object of the invention is to provide a system and to achieve a method enabling the mail service of a service provider or a data center to be allocated for other purposes in case dedicated applications need complementary in-house resources.

Another object of the invention is to provide a system and to achieve a method enabling the availability of mail services in a service provider or a data center to be maintained when these mail services require a larger infrastructure to answer greater demands or when the in-house infrastructure requires maintenance or for resiliency including countering security attacks and infrastructure failures.

The invention therefore relates to a method of re-routing mail traffic exchanged with a messaging system in a data transmission system in which at least one user connected to an IP transport network such as the Internet can transmit requests to and receive data from a plurality of servers through a load balancer. At least one of the servers comprises a mail server in charge of the mail exchange with the user through the IP transport network. This method comprises the steps of forwarding a routing context to an external service infrastructure partner (SIP) device when the system is triggered by an event A, reconfiguring the load balancer in order to be able to send a mail protocol to the SIP device when receiving mail traffic to be re-routed to the SIP device, and forwarding a user context to the SIP device.

According to another aspect, the invention relates to a system for re-routing mail traffic exchanged with a messaging system wherein a user connected to an IP transport network such as the Internet can transmit requests to and receive data from a plurality of servers through a load balancer. At least one of the servers comprises a mail server in charge of the mail exchange with the user through the IP transport network. This system comprises a dynamic workload (DW) device connected to the load balancer and adapted to take the action of re-routing when receiving a triggering event (A). Such a DW device is in charge of forwarding a routing context and a user context to a service infrastructure partner (SIP) device connected to the DW device via an access network and adapted to perform the mail exchange with the user when the DW device has been triggered, and also reconfiguring the load balancer.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
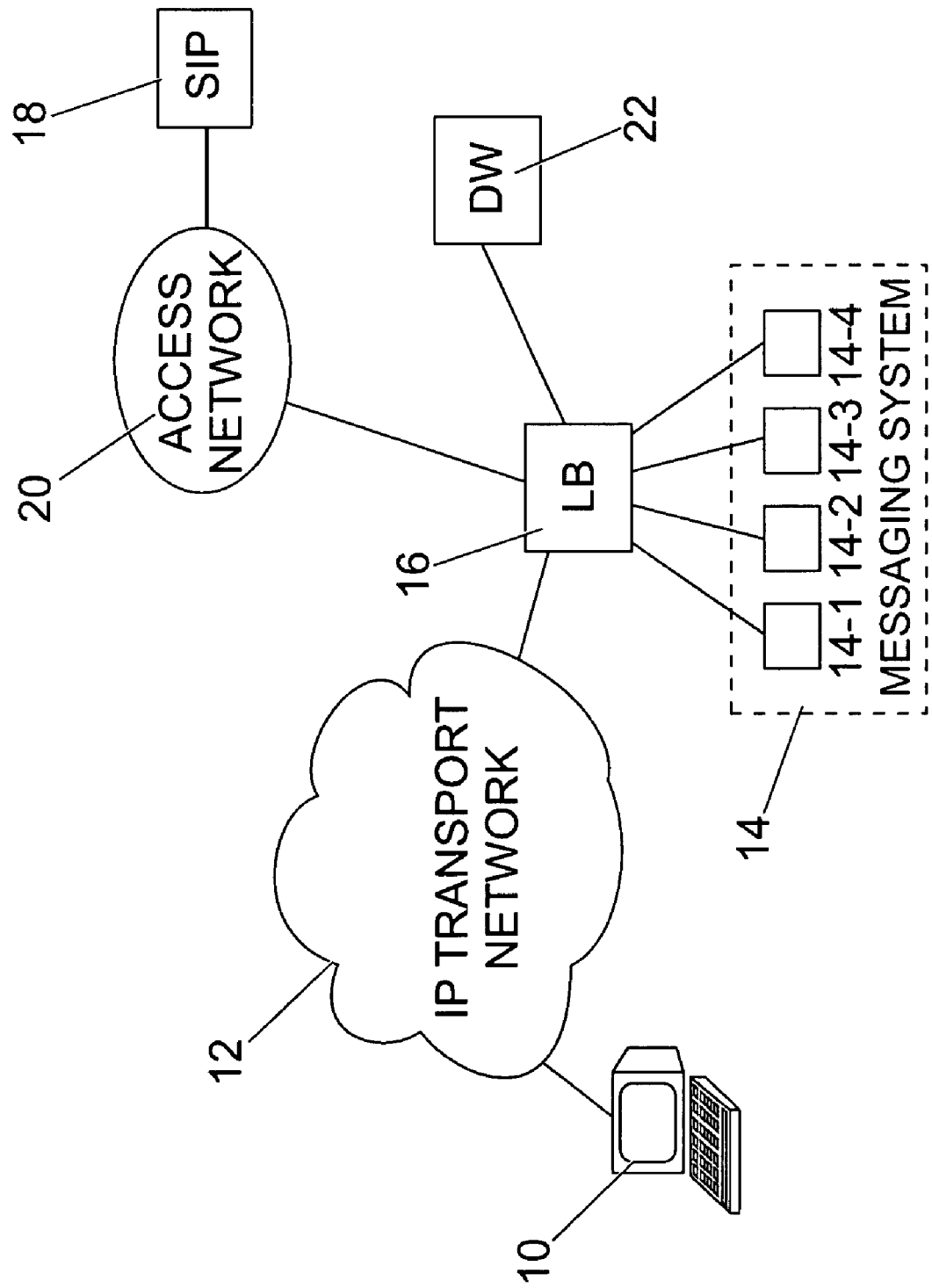
FIG. 1 is a block diagram representing a system for re-routing messaging traffic to a service infrastructure partner (SIP) according to the invention.

In reference to FIG. 1, it is assumed that a plurality of hosts such as host 10 can exchange messages or obtain web services through an IP transport network 12 by using a messaging system 14.

The messaging system 14 is composed of a set of servers 14-1, 14-2, 14-3, 14-4, which could be normally any kind of servers but are mail servers in the present invention. These mail servers are used to deliver mail and are generally Simple Mail Transfer Protocol (SMTP) servers or Message Transfer Agent (MTA) servers. The traffic exchanged through the IP transport network 12 passes through a load balancer 16 which is in charge of balancing the traffic load amongst all the mail servers 14-1 to 14-4. It should be noted that the load balancer 16 and the messaging system 14 can be owned by a service provider or included in the data center of a company.

Assuming that the traffic load can no longer be processed by the messaging system 14, the principle of the invention is to use a service infrastructure partner (SIP) 18, which can be external resources made available as a mail service provided by other lines of business inside the company or another company or a service provider. The SIP 18 is connected to the load balancer 16 by means of an access network 20 which can be any kind of network such as a wide area network (WAN) or a local area network (LAN), but also a single specialized line. When the installation of re-routing has been completed as described below, all the mail traffic from the IP transport 12 is re-routed to SIP 18 by the load balancer 16 via the access network 20.

As the solution of sending mail traffic to another mail infrastructure has to be completely transparent to the users, a dynamic workload (DW) device 22 in charge of reconfiguring the load balancer 16 is provided. The DW device 22 transfers to the SIP 18 all the data required for ensuring mail exchange as soon as it is decided to reroute the traffic to the SIP 18. Note that the dynamic workload device 22 can be triggered to take the action of re-routing in an automatic way (on the basis of technical and business rules), in a manual way (manual trigger by an operator or as a trigger of an external information such as when the priority has to be given to another service), or a mix thereof.

Figure 2:
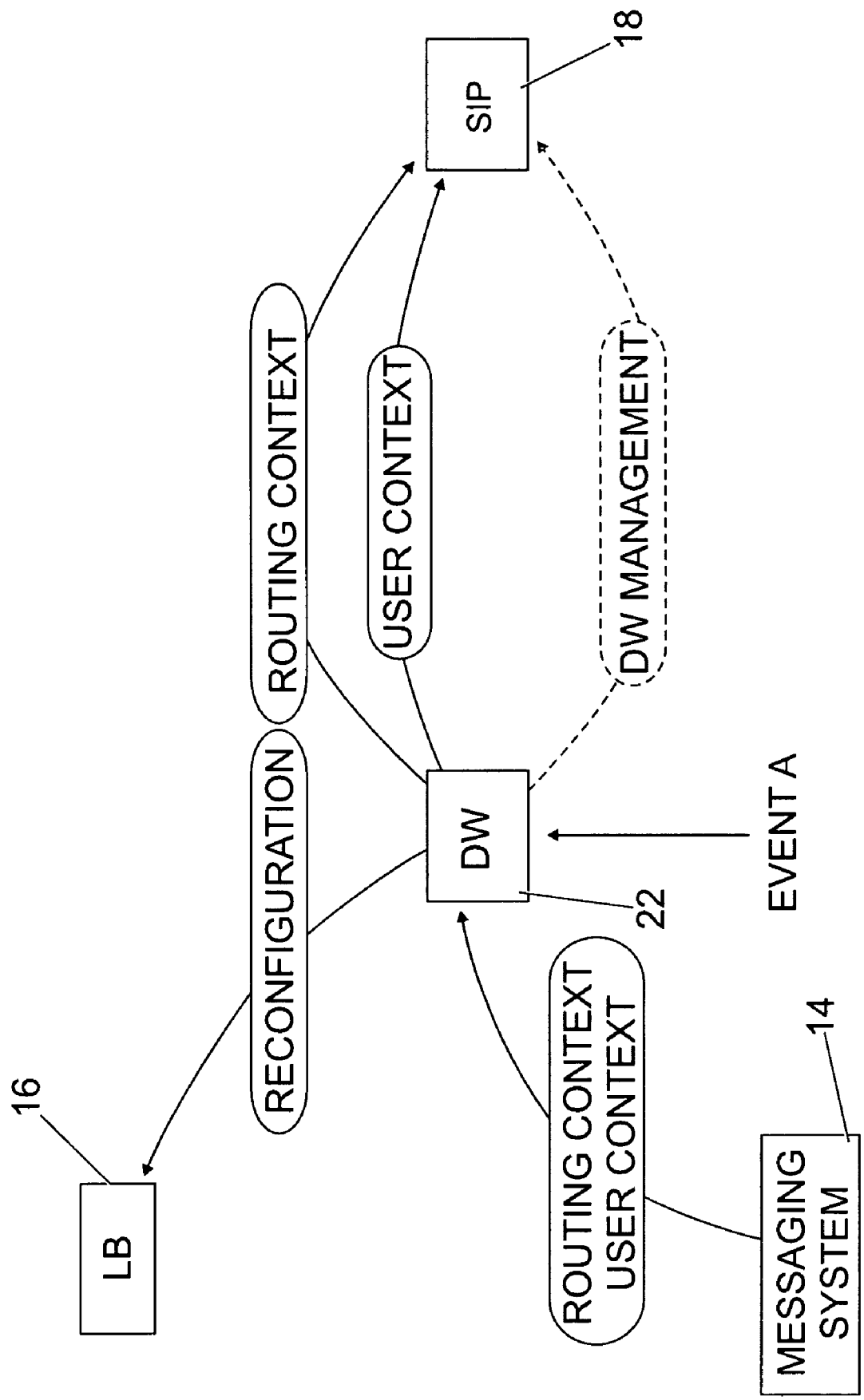
FIG. 2 is a schematic diagram representing the exchange of data between the dynamic workload and the other components of the system when the decision of re-routing is triggered.

As illustrated in FIG. 2, the first step of the method of re-routing according to the invention is the arrival of an event A which is, as mentioned above, a manual or automatic operation triggering the DW device 22 for taking the action of re-routing.

At this stage, it is assumed that the DW device 22 has already obtained the routing context and the user context from the messaging system 14 as illustrated in FIG. 2. The routing context which is provided by the mail servers includes:

a list of the domain names/IP addresses to be supported (POP, IMP, SMTP);
  a list of the domain names/passwords for the SMTP connection with authorization;
  a list of the domain names supported as SMTP relay; and
  a list of the distribution lists to be expanded.

Whereas the user context which is normally stored in a Light Weight Directory Authorization Protocol (LAP) server includes:

a list of login/passwords per user; and
  a user list of Auto-forward/Auto-copy set-up.

When triggered, the DW device 22 forwards the routing context as defined above to the SIP 18 whose availability has been checked previously. Then, the load balancer 16 is reconfigured by the DW device 22 in order to be able to send the mail protocol (SMTP/POP3/IMAP4) to the SIP 18 when receiving the mail traffic to be re-routed to the SIP 18. Then, the DW device 22 forwards the user context as defined above to the SIP 18. Note that the SIP 18 should have a SIP workload manager at its disposal, with information corresponding to all the routing and parameter information. If it is not the case, the DW management is duplicated into the SIP 18.

When the SIP 18 has received all the necessary information as illustrated in FIG. 2, it is a mail infrastructure which is, except for the workload management, the same mail infrastructure as the messaging system including the SMTP servers, the LDAP server, the user mailboxes, POP3, IMP, etc.

Finally, at the end of the re-routing installation, the DW device 22 informs any other workload managers/automatic provisioning system of the messaging system 14 that the traffic is now re-routed and that the associated resources that were used for the mail exchange can be used for other services.

Figure 3:
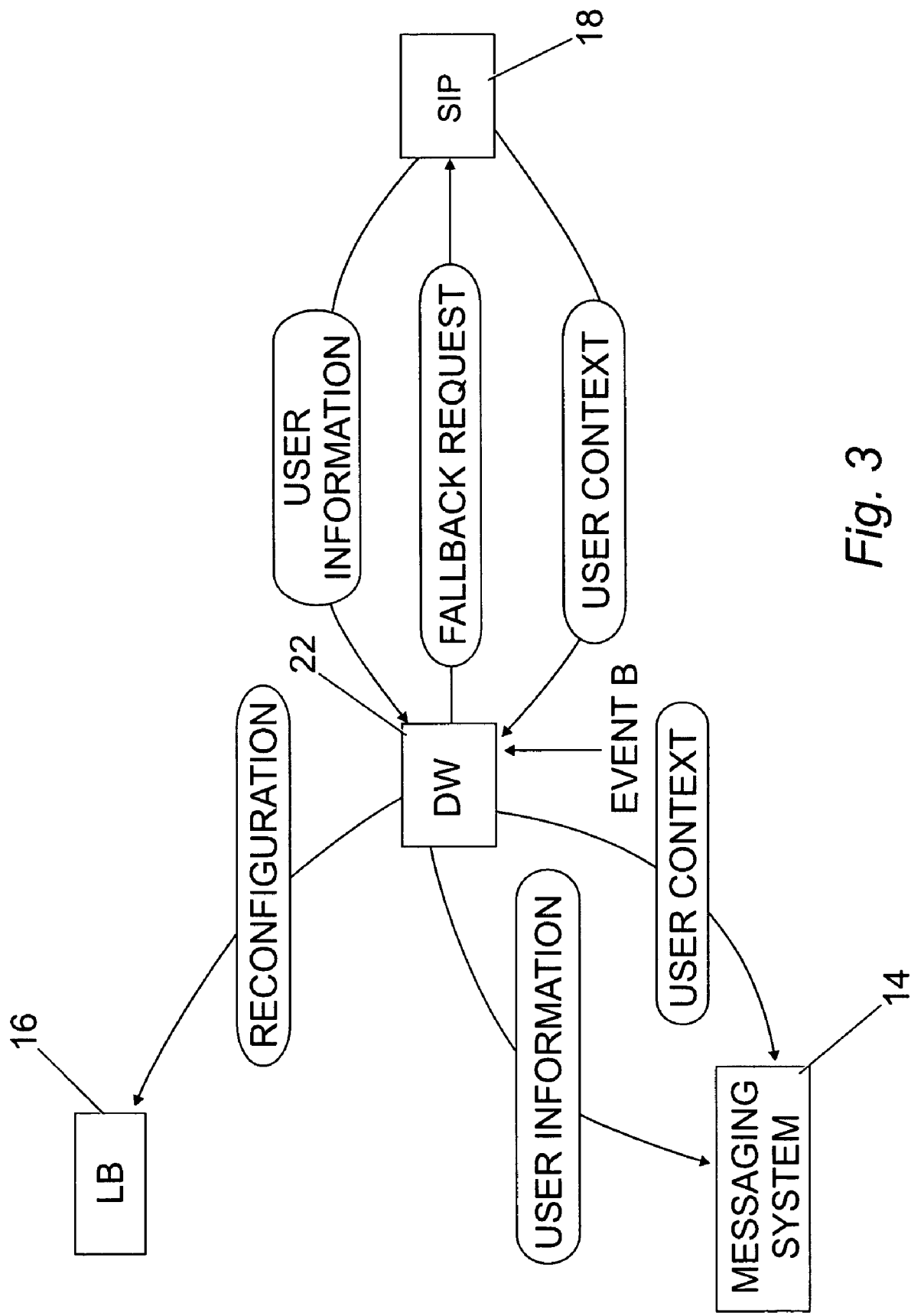
FIG. 3 is a schematic diagram representing the exchange of data between the dynamic workload and the other components of the system when re-routing is no longer required.

When it is decided to return to the original situation, that is to fallback (e.g., because the mail traffic decreases) an action referenced as event B triggers the DW device 22 as illustrated in FIG. 3. The following steps are taken:

the DW device 22 requests the SIP 18 to stop modifying the user information and requests the SIP 18 to forward back this user information;
  the user information is immediately sent to the messaging system 14 in order to re-install it in the LDAP server;
  the load balancer 16 is reconfigured by the DW device 22 so that the mail traffic is no longer re-routed,
  the DW device 22 requests the user context from the SIP 18 and, in particular, the read messages from the last update and all the new messages per user; and
  the user context is forwarded to the messaging system by the DW device 22 in order to be re-installed.

The invention claimed is:

1. A method of re-routing mail traffic exchanged with a messaging system in a data transmission system in which at least one user connected to an Internet Protocol (IP) transport network can transmit requests to and receive data from a plurality of servers through a load balancer, at least one of the servers being a mail server in charge of mail exchange with the user through the IP transport network;

the method comprising the steps of:
  providing a dynamic workload (DW) device that, when a decision of re-routing the mail traffic is made by an event A, is configured to:
  forward a mail routing context to an external service infrastructure partner (SIP) device when the system is triggered, the routing context comprising a list of domain names to be supported, and a list of IP addresses to be supported, and a list of distribution lists to be expanded,
  reconfigure the load balancer in order to be able to send a mail protocol to the SIP device when receiving the mail traffic to be re-routed to the SIP device,
  forward a mail user context to the SIP device, the user context including a list of login names and passwords for each user and a user list of Auto-forward/Auto-copy set-up, and
  inform the messaging system that the mail traffic has been re-routed and that associated resources of the messaging system that were used for mail exchange can be used for other services,
  wherein the routing context and user context provide all required data for ensuring mail exchange using the SIP in a manner that is completely transparent to users of the messaging system as soon it is decided to re-route the mail traffic to the SIP.

2. Method according to claim 1, wherein the decision of re-routing the mail traffic is taken when the DW device is triggered by the event A.

3. Method according to claim 2, wherein the event A is a manual action from an operator when priority has to be given to other services or an automatic action based on technical or business rules.

4. Method according to claim 2, wherein the system comes back to its original situation when the DW device is triggered by an event B.

5. Method according to claim 4, wherein the DW device takes the following actions when receiving the event B:

informing the SIP device to stop modifying user information and to forward back the user information;

sending the user information to the messaging system;

reconfiguring the load balancer so that the mail traffic is no longer re-routed;

requesting from the SIP device the user context and all read messages from a last update and all new messages per user; and forwarding the user context to the messaging system in order to re-install it therein.

\* \* \* \* \*

UNITED STATES PATENT AND TRADEMARK OFFICE
CERTIFICATE OF CORRECTION

PATENT NO. : 7,647,379 B2
APPLICATION NO. : 11/009328
DATED : January 12, 2010
INVENTOR(S) : Drouet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1016 days.

Signed and Sealed this

Sixteenth Day of November, 2010

David J. Kappos
*Director of the United States Patent and Trademark Office*